UNITED STATES PATENT OFFICE.

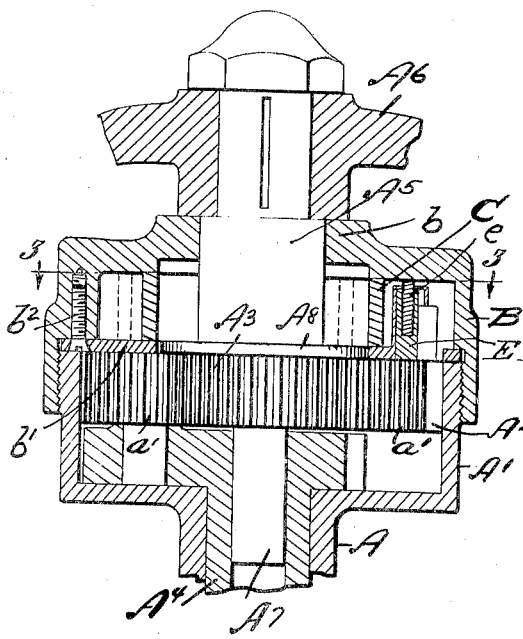
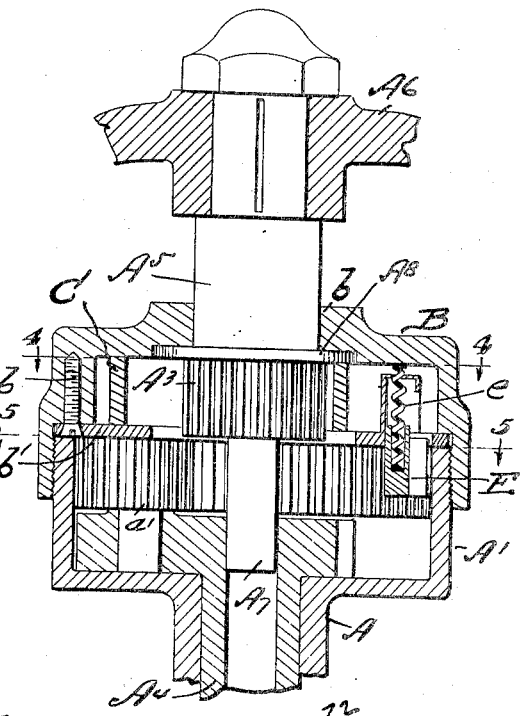
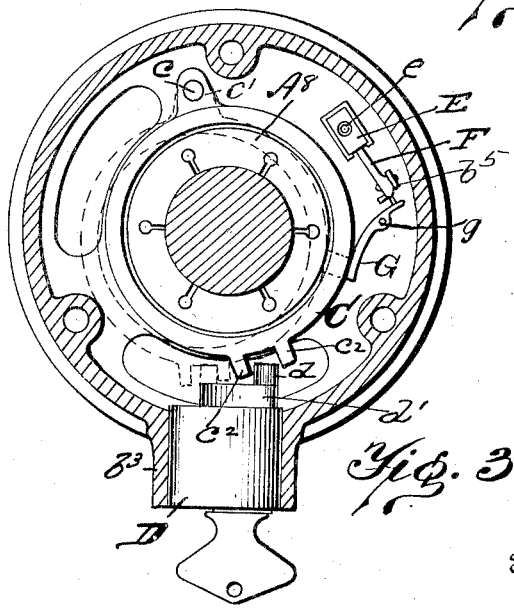
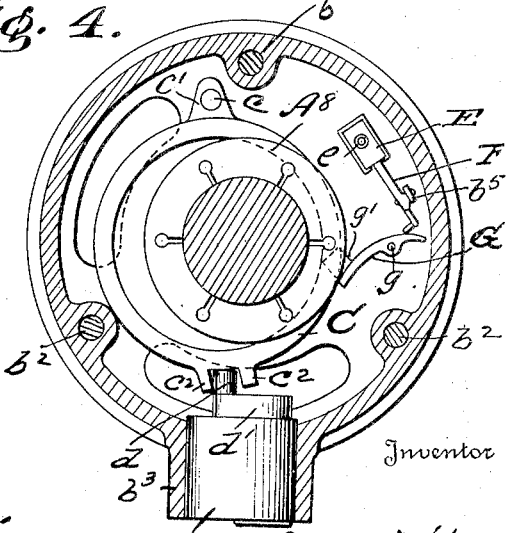

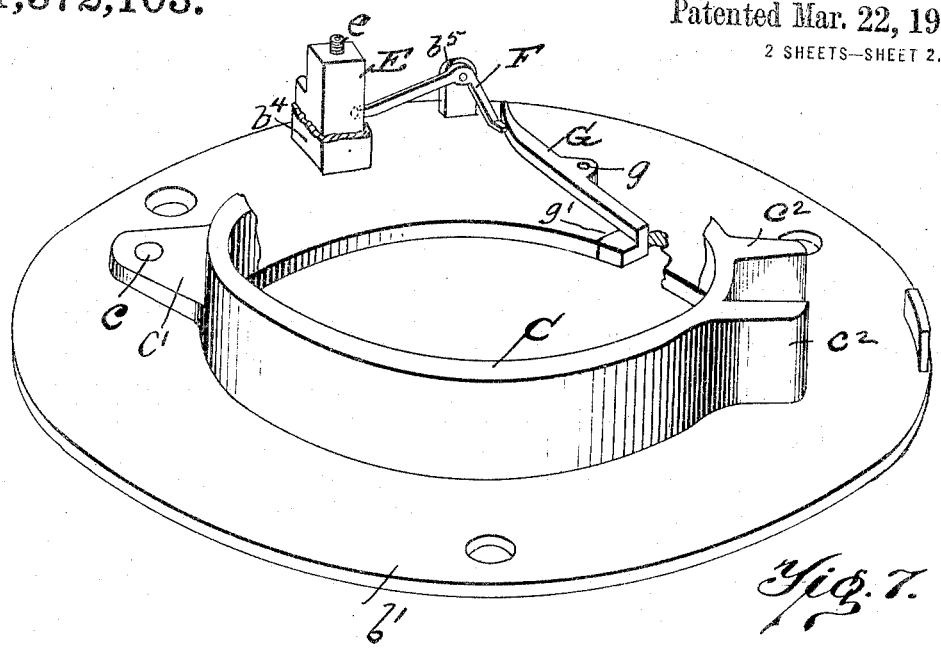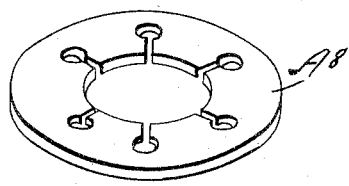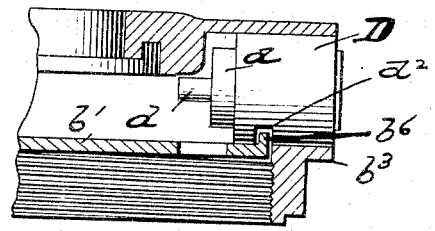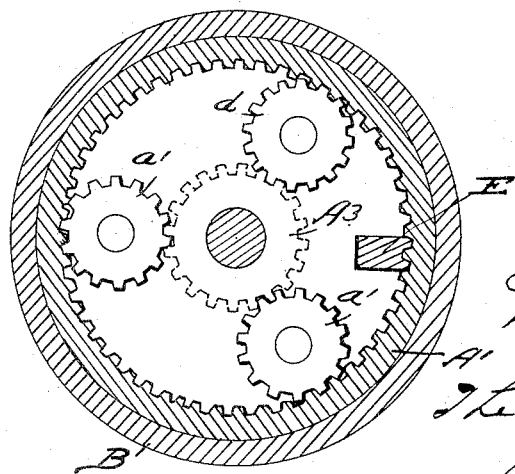

THEODORE D. STANLEY, OF DETROIT, MICHIGAN, ASSIGNOR TO LELAND LOCK COMPANY, OF DETROIT, MICHIGAN, A CORPORATION OF MICHIGAN.

STEERING-WHEEL LOCK.

1,372,103.   Specification of Letters Patent.   Patented Mar. 22, 1921.

Application filed November 17, 1919. Serial No. 338,617.

*To all whom it may concern:*

Be it known that I, THEODORE D. STANLEY, citizen of the United States, residing at Detroit, county of Wayne, State of Michigan, have invented a certain new and useful Improvement in Steering-Wheel Locks, and declare the following to be a full, clear, and exact description of the same, such as will enable others skilled in the art to which it pertains to make and use the same, reference being had to the accompanying drawings, which form a part of this specification.

This invention relates to locks for the steering wheels of automobiles whereby the steering wheels may be held in inoperative relation to the steering gear or mechanism, the parts being so disposed and arranged as to be easily assembled with and connected to a steering gear mechanism of well known type, without adding appreciably to the structure of the steering post upon which the mechanism is placed.

The invention consists in the matter hereinafter set forth, and more particularly pointed out in the appended claims:—

Referring to the drawings:—

Figure 1 is a view in longitudinal section, with parts in elevation of a steering post and wheel with connecting mechanism, together with a locking device that embodies features of the invention, the parts being shown with the steering wheel in engaged or operative position.

Fig. 2 is a similar view in section with the steering wheel in disengaged position.

Fig. 3 is a view in transverse section taken on or about line 3—3 of Fig. 1 with the position assumed by a locking ring when the wheel is disengaged, indicated by the dotted lines.

Fig. 4 is a view in detail taken on or about line 4—4 of Fig. 2.

Fig. 5 is a view in detail taken on or about line 5—5 of Fig. 2.

Fig. 6 is a view in detail of a lock.

Fig. 7 is a view in detail, greatly enlarged, of the base plate of a cover together with a locking ring and lever and associated mechanism, parts being broken away for clear view.

Fig. 8 is a view in detail of a thrust washer.

In the drawings, a steering wheel column A has an enlarged upper end portion or casing $A'$ in which planetary pinions $a'$ are housed in mesh with an inner gear annulus $A^2$ secured to the casing, the pinions being so disposed that when driven by a main gear $A^3$, they operate the steering shaft or spindle $A^4$ in the usual manner. A steering wheel spindle $A^5$ and steering wheel $A^6$ operate the gear $A^3$, the mechanism being of the customary type and not by itself forming a feature of the invention, but the spindle $A^5$ has a pilot $A^7$ that is reciprocatable and rotatable in the shaft $A^4$ whereby the steering wheel and spindle may be raised in the position shown in Fig. 2 with the gear $A^3$ completely disengaged from the pinions $a'$.

A cover B is screw threaded or otherwise detachably secured on the casing $A'$ and has a boss $b$ in which the spindle $A^5$ is journaled, the bore of the boss being counterbored to form a seat for the reception of a thrust washer $A^8$ against the upper end face of the gear $a^3$.

A base plate $b^1$ is secured in the cover as by screws $b^2$ as a support for a locking ring C which swings on a pivot pin $c$, passing through a lug $c^1$ of the ring and entering the base plate $b^1$.

A pair of lugs $c^2$ oppositely disposed to the pivot lug $c$, are engaged by the ward $d$ of the rotatable barrel $d^1$ of the lock D secured in a boss $b^3$ of the cover B, so that rotation of the barrel oscillates the ring on its pivot and, when the steering wheel is raised to the position of Fig. 2, forces the ring under the washer $A^8$ and thereby retains the gear $A^3$ out of mesh with the pinions $A'$. To prevent displacement of the ring to neutral position by forcing down the spindle $A^5$ as by hammering it, the washer $A^8$ has an interrupted margin, so that the washer does not spring down and tend to act as a wedge or cam to force the ring out of the way of the washer, as it might do if the washer was in tact, the severed portions jamming the mechanism when an attempt is made to force the locking device into engagement in the manner stated.

To prevent withdrawal of the cover B from the casing A, when the gear $A^3$ is disengaged, a block E is slidable in the guide portion $b^4$ of the base plate $b'$ and is so formed that when projected through the plate it locks with the teeth of the internal gear A² and thereby holds the cover from rotation. As one means of obtaining the proper movement of the block E a spring *e* tends to force the block downward and in so doing, tends to swing a bell crank lever F, that is mounted on a lug $b^5$ of the cover plate $b'$. A lever G is pivoted as at *g* on the base plate $b^1$ so that one end portion $g^1$ of the lever underruns the locking ring C and bears against the side thereof. As the ring is swung into the position shown in Fig. 2 the lever G follows under the influence of the spring *e* which thereby forces the block E down, the lever F translating the motion of the block E to the otherwise free arm of the lever G. Reverse movement of the ring returns the block E to initial position so that the cover B is removable whenever the steering wheel mechanism is in gear.

As a detail of construction the casing of the lock D may be slotted as indicated at $d^2$ so that it may be turned into engagement with a lug $b^6$ on the base plate $b^1$, this holding the lock against withdrawal.

As a result of this construction a very simple and efficient locking means is obtained, the disposition of the parts preventing tampering with the same while the lock may be quickly and easily assembled in combination with the type of steering mechanism shown.

Obviously changes in the details of construction may be made without departing from the spirit of the invention and I do not care to limit myself to any particular form and arrangement of parts within the scope of the appended claims.

I claim:—

1. In a steering wheel locking device for automobiles, a casing and cover for housing the gearing of an automobile steering mechanism, means housed with the gearing and adapted when moved from initial position to hold the gearing inoperative, a lock for shifting the gear locking means, a lever pivoted on the cover, contacting at one end with the gear locking means, a bell crank pivoted on the cover to swing in a plane transverse to the plane of motion of the lever and operated by the other end portion of the lever, a member reciprocable in the cover operated by the bell crank and a spring for projecting the block and thereby maintaining the lever in contact with the shifting gear lock means.

2. In a steering wheel locking device for automobiles, a main shaft, a casing around the shaft, gearing housed in the casing for operating the shaft, a locking ring housed with the gearing adapted when moved eccentrically to lock the gearing, a cover detachably secured on the casing, a member shiftable in the cover to engage the casing and lock the cover thereon, a lever pivoted to swing in the plane of motion of the ring with one end portion abutting the ring, a bell crank pivoted to swing in a plane transverse to the lever motion and adapted to translate the motion of the otherwise free arm of the lever to the member shiftable in the cover and a spring for projecting said member when the movement of the ring permits movement of the lever.

3. In a steering wheel locking device for automobiles, a casing housing the gearing of the steering mechanism, a cover detachably secured on the casing, a base plate on the cover, a gear locking ring pivoted to swing on the plate eccentrically into engagement with the gearing, a lever pivoted on the plate to swing against and follow the ring, a bell crank pivoted to swing on the plate transversely to the lever, a block reciprocatable through the base plate into engagement with the casing for locking the cover on the casing and operatively connected by the bell crank to the lever, and a spring operating and projecting the block into engagement with the casing when the movement of the ring permits movement of the lever and bell crank.

4. In a steering wheel locking device for automobiles, a casing a planetary gearing within the casing including an inner gear annulus secured to the casing and planetary pinions in mesh therewith, a driving gear normally in mesh with the pinions and axially movable out of mesh and within a cover detachably secured on the casing, a base plate on the cover through which the main gear is movable, a gear locking ring pivoted on the plate and adapted to swing under the withdrawn main gear into eccentric relation with the planetary system, a lever pivoted on the plate to swing against and follow the ring, a block reciprocable through the plate into engagement with the inner gear annulus, a spring adapted to project the block into such engagement and a bell crank pivoted to swing transversely to the lever and adapted to connect the lever and block whereby the spring projects the block when the movement of the ring permits movement of the lever.

5. In a steering wheel locking device for automobiles, a casing and a movable cover for housing the gearing of an automobile steering mechanism, a planetary gearing within the casing including an internal gear and planetary pinions in mesh therewith and a driving gear in mesh with the pinions and manually movable axially out of mesh and within the cover, means housed with the gearing and adapted when moved from initial position to hold the gearing inoperative, a lock for shifting the gear locking means, a lever pivoted within the cover, contacting at one end with the gear locking means, a bell crank pivoted within the cover to swing in a plane transverse to the plane of motion of the lever and operated by the other end portion of the lever, a member reciprocatable in the cover operated by the bell crank and a spring for projecting the block and thereby maintaining the lever in contact with the shifting gear lock means.

In testimony whereof, I sign this specification in the presence of two witnesses.

THEODORE D. STANLEY.

Witnesses:
SAMUEL E. THOMAS,
LOUIS F. HAWKINS.